(12) United States Patent
Mosman

(10) Patent No.: US 7,459,803 B2  
(45) Date of Patent: Dec. 2, 2008

(54) ISO-PARALLEL UPS SYSTEM CONFIGURATION

(75) Inventor: Michael J. Mosman, Columbia, MD (US)

(73) Assignee: Isolated Parallel Inc., Baltimore, MD (US)

( * ) Notice: Subject to any disclaimer, the term of this patent is extended or adjusted under 35 U.S.C. 154(b) by 0 days.

(21) Appl. No.: 11/832,823

(22) Filed: Aug. 2, 2007

(65) Prior Publication Data

US 2008/0034256 A1    Feb. 7, 2008

Related U.S. Application Data

(60) Provisional application No. 60/821,384, filed on Aug. 3, 2006.

(51) Int. Cl.
H02J 9/00 (2006.01)

(52) U.S. Cl. ................................................. 307/64
(58) Field of Classification Search .......................... None
See application file for complete search history.

(56) References Cited

U.S. PATENT DOCUMENTS

| 4,827,152 | A | | 5/1989 | Farkas | |
|---|---|---|---|---|---|
| 6,134,124 | A | * | 10/2000 | Jungreis et al. | 363/34 |
| 6,177,738 | B1 | * | 1/2001 | Hentunen et al. | 307/67 |
| 6,198,176 | B1 | * | 3/2001 | Gillette | 307/64 |
| 6,657,321 | B2 | * | 12/2003 | Sinha | 307/68 |
| 6,969,922 | B2 | * | 11/2005 | Welches et al. | 290/1 A |
| 7,060,379 | B2 | * | 6/2006 | Speranza et al. | 429/9 |
| 7,157,803 | B2 | * | 1/2007 | Meyers et al. | 290/1 A |
| 7,330,016 | B2 | * | 2/2008 | Colley | 322/47 |
| 2004/0201282 | A1 | * | 10/2004 | Kado et al. | 307/64 |

(Continued)

FOREIGN PATENT DOCUMENTS

DE    11 37 110 B    9/1962

(Continued)

OTHER PUBLICATIONS

Electrical Transmission and Distribution Reference Book, Central Station Engineers of the Westinghouse Electric Corporation, East Pittsburgh, Pennsylvania, 4th Edition, Copyright 1950.

(Continued)

*Primary Examiner*—Michael J Sherry
*Assistant Examiner*—Adi Amrany
(74) *Attorney, Agent, or Firm*—Miles & Stockbridge P.C.; Michael A. Minter, Esq.

(57) ABSTRACT

An Iso-Parallel UPS system may combine the system redundancy, isolation and fault-limiting properties of isolated-redundant systems, with the ability to spread system load evenly across all modules like paralleled systems. This system may have the following features: (1) the critical load can be divided into two or more portions, and each portion may be individually fault tolerant, i.e., any electrical fault on a critical load will affect only the load in that portion—other portions of the critical load can remain connected and operating; (2) the critical load can be shared among all modules within the configuration, and all modules may be equally loaded, or nearly equally loaded—there is no designated redundant unit; and (3) any module can be taken out for maintenance without impacting the critical load.

23 Claims, 9 Drawing Sheets

U.S. PATENT DOCUMENTS

| | | | |
|---|---|---|---|
| 2005/0200205 A1* | 9/2005 | Winn et al. | 307/64 |
| 2006/0017328 A1* | 1/2006 | Bryde | 307/64 |
| 2006/0167569 A1 | 7/2006 | Colombi et al. | |
| 2008/0088183 A1* | 4/2008 | Eckroad et al. | 307/66 |

FOREIGN PATENT DOCUMENTS

| | | |
|---|---|---|
| DE | 15 63 515 A1 | 4/1970 |
| DE | 198 57 754 C1 | 9/2000 |
| EP | 0 359 027 A | 3/1990 |
| EP | 0 519 574 A | 12/1992 |
| EP | 1 006 641 A | 6/2000 |

OTHER PUBLICATIONS

Diesel UPS/CPS systems, Continuous power, Hitec Power Protection, The Netherlands, May 31, 2006 date alleged by third-party submission under 37 CFR § 1.99, but unsubstantiated.

No-Break KS, Dynamic UPS System Presentation, Euro-Diesel S.A., Belgium, Jun. 12, 2002.

PCT International Application No. PCT/US07/75042 - PCT International Search Report and Written Opinion of the International Searching Authority Mailed Aug. 1, 2008.

EPO Communcation dated Jan. 16, 2008 including European search opinion and search report.

PCT International Applicaiton Application No. PCT/US07/75042 - PCT International Search Report and Written Opinion of the International Searching Authority mailed Aug. 1, 2008.

* cited by examiner

ISO-PARALLEL UPS SYSTEM CONFIGURATION

BACKGROUND

1. Technical Field

The subject invention relates to uninterruptible power supply (UPS) systems generally, and more specifically, to isolated-parallel rotary UPS configurations.

2. Background

Uninterruptible Power Supply (UPS) systems are often used to protect critical facility electrical loads from power disruptions where loss of equipment functionality cannot be tolerated. UPS systems typically incorporate some form of short term power storage to support "no-break" electrical loads while a backup power source is engaged and connected to the loads. The backup power is very often supplied from one or more diesel-fueled engine-generators located on the facility premises.

Diesel UPS Systems, for example, rotary Uninterruptible Power Supply Systems using flywheel-type energy storage coupled with standby diesel engines, are a popular form of power backup due to their compact size and lack of large chemical batteries. However, they can have some drawbacks, including, for example, the short ride-through time of flywheels compared to batteries. More significantly a flywheel-based UPS typically requires a one-to-one pairing of a flywheel with a diesel engine, usually involving a mechanical clutch mechanism between the constantly rotating UPS machine and the mostly idle standby engine. Therefore, a failure of a diesel can also mean failure of the associated UPS.

To offset these potential drawbacks, Diesel UPS Systems are often connected into paralleled groups for both capacity and redundancy. Parallel groups typically have two or more UPS systems, or modules, connected to a common output bus, and may have extra modules for redundancy. This is referred to as paralleled module redundancy, or parallel-redundancy. Recent designs for "upper tier" facilities go beyond parallel-redundancy and incorporate multiple parallel groups for the critical loads in which critical parallel busses as well as modules are duplicated for redundancy. Such group redundancy, often referred to as "N+N redundancy," provides two or more separate configurations capable of supporting all critical loads with one parallel group out of service. Since the engines in a typical Diesel UPS System share the same redundancy level as the flywheels, parallel group redundancy in Diesel UPS Systems can become quite costly compared to battery-type UPS systems backed up by a separate, standby engine-generator system that may be installed with only module redundancy, or "N+1 redundancy."

In order to provide more cost competitive solutions and still provide system output bus redundancy, Diesel UPS Systems, as well as most other types of UPS systems, can be arranged in isolated-module redundant configurations in which a dedicated redundant module backs up two or more separate load carrying modules. The larger the total critical load is in relation to the size of the module or system employed, the more economical it is to configure the equipment as an isolated-module redundant N+1 configuration versus a group-redundant N+N configuration. Arranging large numbers of UPS systems into independent modules instead of massively paralleled groups has the added benefit of reducing fault current levels at the loads, and limiting the effects of faults to smaller portions of the total load.

However both parallel group redundant and isolated-module redundant configurations rely on fast switching mechanisms to transfer critical load from a failed group or module to the designated redundant group or module. Also, isolated-module redundant configurations are susceptible, under certain kinds of stimulation, to the risk of overloading the redundant module. There have been cases documented for both Diesel UPS System and battery-type UPS systems where several primary modules simultaneously reacted to a mutual disturbance and transferred their critical loads to the redundant module, crashing it and the loads. Furthermore, isolated-module redundant configurations with independent modules serving independent loads, as opposed to paralleled modules with a combined load, can result in load imbalances on the modules, and possible overloading or under-utilization of certain modules. Accordingly, a configuration of UPS systems to overcome the above deficiencies is needed.

SUMMARY

In accordance with one or more embodiments of the present invention, an Isolated-Parallel Rotary Diesel UPS System Configuration is provided which combines the system redundancy and isolation and fault limiting properties of an isolated-module redundant UPS system configuration, with the ability to share power and loads among all modules, as in a paralleled UPS system configuration. This configuration will be interchangeably referred to herein as an "Iso-Parallel Configuration" or "IP Configuration." An Iso-Parallel Configuration may have the following advantages and features:

1. The Critical Loads may be divided into two or more portions, and each portion may be individually fed from an independent Diesel UPS System Output Bus.
2. Each UPS Output Bus is generally fault isolated from the others, i.e. an electrical fault on any UPS Output Bus or its attached Critical Load will not adversely affect the Critical Loads connected to any other Output Bus. The Critical Loads on all but the faulted busses remain connected and operating.
3. The electrical power demand of all Critical Loads may be shared among all Systems within the IP Configuration, and all Systems may be equally or nearly equally loaded.
4. The portions of Critical Loads do not have to be equally divided among the Output Busses connected in an IP Configuration. In addition, portions of Critical Load may be electrically switched from one Output Bus to another and back without concern for the capacity of the Systems feeding each Output Bus.
5. The number of redundant Systems in the IP Configuration may be dependent only on the number of Systems in the IP Configuration and the total Critical Load. There is generally no designated redundant System or module with no load.
6. Any System may be taken out for maintenance without impacting its connected loads. The Critical Loads of the System under maintenance may be supported equally by all the other Systems that remain connected in the IP Configuration.
7. Individual Systems with their connected Critical Loads may be removed from the IP Configuration (i.e., operated as a stand-alone System) and be returned to the IP Configuration later.
8. The Iso-Parallel Configuration may be used with low voltage (600 volts or less) and/or medium voltage (above 600 volts, up to 35 kV) applications.

In accordance with one or more embodiments of the present invention, Diesel UPS Systems, with their line-interactive chokes and synchronous machine/flywheel UPS components, may be configured to provide these advantages and features. Diesel UPS Systems with their Diesel Engine and the Flywheel electrically coupled (electrically-coupled Diesel UPS Systems), as well as Systems in which the Diesel Engine and the Flywheel are mechanically coupled with an overriding clutch (mechanically-coupled Diesel UPS Systems), may be suitable for this application.

In accordance with one or more embodiments of the present invention, generally, the only potential restriction to using an Iso-Parallel Configuration is the requirement for a common utility source. In general, all Diesel UPS Systems arranged to share power in an IP Configuration must have the same utility power source, i.e., all utility inputs must be phase synchronized. Utility inputs may be switched from one utility source to another, but all Systems should be switched as a group.

In accordance with one or more embodiments of the present invention, a Static UPS, incorporating line-interactive chokes and chemical storage batteries and used with electrically coupled engine-generators, or standard Diesel Engine-Generators without flywheels may also be arranged in Isolated-Parallel Configurations similar to those with Diesel UPS Systems. For the purposes of describing the present invention the following examples and accompanying drawings refer to IP Configurations with Diesel UPS Systems. However, not all embodiments of this invention are limited to Diesel UPS Systems and some embodiments are intended to cover applications involving Static UPS as well as Diesel UPS System and other types of rotary UPS systems.

It will be apparent to those skilled in the art of UPS design and application that modifications and variations of this invention can be made without departing from the spirit and scope thereof. Therefore, it is intended that the present invention described herein cover all modifications and variations of this invention falling within the scope of the claimed characteristics and features and their equivalents.

BRIEF DESCRIPTION OF THE DRAWINGS

The accompanying drawings, wherein like parts are identified by like reference characters, are incorporated in and constitute a part of the specification. In the accompanying drawings, dashed lines are used to represent logical control of preferred and alternate conducting paths within the circuits.

DETAILED DESCRIPTION

Definition of Terms

Figure 1:
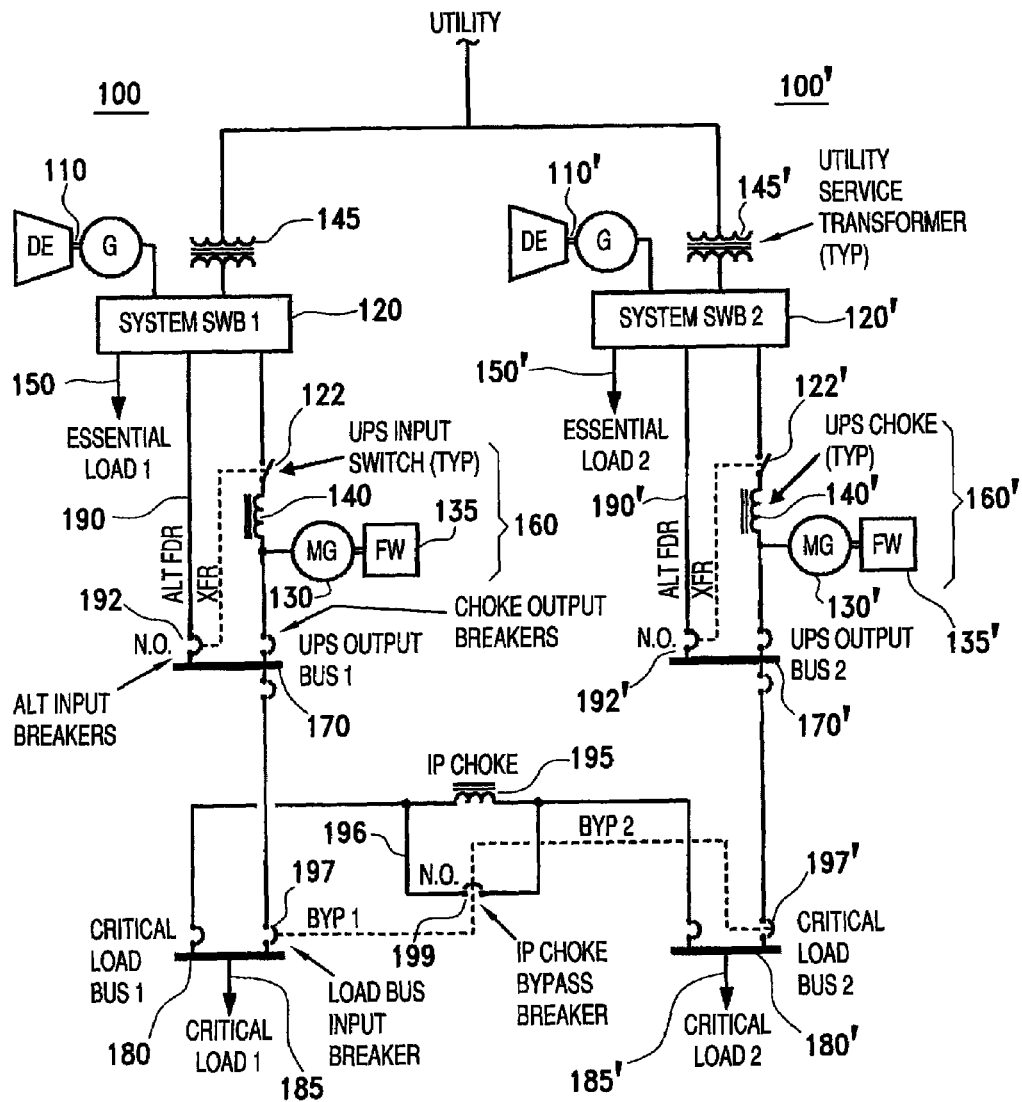
FIG. 1 is a functional/circuit block diagram of two electrically-coupled Diesel UPS Systems arranged in an Iso-Parallel Configuration, in accordance with an embodiment of the present invention.

The following terms are used consistently throughout this specification as defined below:

1. "Diesel UPS System" or "System" or "UPS" or "module" shall denote a flywheel-based diesel-backed uninterruptible power supply system and auxiliary equipment required to operate it, including any input/output devices and associated switchboards.
2. "Choke" shall denote the line inductor portion(s) of a Diesel UPS System providing power conditioning to the Critical Load or connection to an IP Bus.
3. "Flywheel" shall denote that portion of a UPS containing the equipment and controls necessary to store energy for potential use in supporting Critical Loads during periods where input power is absent.
4. "Synchronous Motor-Generator (SMG)" or "Induction Motor-Generator (IMG)" or "Motor-Generator (MG)" shall denote the rotating machine portion of the UPS used to couple the Flywheel with the Choke to store energy in and retrieve energy from the Flywheel, and for output voltage adjustment via interaction with the Choke. Possible machine types include salient pole and wound-rotor types.
5. "Bypass" shall denote direct power flow from an alternate source to Critical Loads as required by the operation of the Diesel UPS System.
6. "Critical Loads" or "No-Break Loads" shall refer to electrical equipment loads that require an uninterrupted or continuous power supply for successful operation.
7. "Essential Loads" or "Short-Break Loads" shall refer to electrical equipment loads that may sustain a short break (e.g., 15 seconds or less) in power and still provide successful operation.

The basic components of a Diesel UPS System are well known to those of skill in the art and will not be separately described herein, except as is necessary to describe the disclosed embodiments. In accordance with one or more embodiments of the present invention, this application describes how multiple Systems may be arranged in a new type of redundant configuration. To facilitate the understanding of the new configuration, it may be helpful to review the composition and operation of a Diesel UPS System or module.

An individual Diesel UPS System or module generally includes (i.e., comprises) the following major components:
1. A 3-phase line inductive Choke.
2. A self-excited, self-regulated alternator acting as an AC Motor-Generator (MG) with appropriate voltage regulation to control the critical output voltage and produce power as needed during System transition to/from diesel power. The Motor-Generator may be a Synchronous Motor-Generator (SMG) or an Induction Motor-Generator (IMG).

3. A flywheel energy storage system, close-coupled with the motor-generator as appropriate for the technology and configuration being utilized.
4. A mechanism for recharging the flywheel and maintaining it at normal operating speed.
5. A separate Diesel Engine-Generator (for electrically-coupled diesel engines), or a diesel engine with an overriding clutch coupling it to the Motor-Generator/Flywheel assembly (for mechanically-coupled diesel engines). The diesel engine is the backup power source used to replace utility power.
6. Module input and output electrical switchboards with breakers and devices to switch power flow, protect module components, and monitor the system.
7. Controls and interfaces to operate the system switchboard breakers as appropriate for the technology and configuration being utilized.
8. Controls and interfaces to operate the associated diesel engine or diesel engine-generator, as appropriate, in order to take up no-break critical loads during the flywheel power ride-through period, and re-supply short-break essential loads within a 10-second period.

In general, a Diesel UPS System conditions incoming AC power at the Choke to block line transients, and adjusts the output voltage at the load side of the Choke via control of the excitation of the parallel connected Motor-Generator which operates as a synchronous condenser to absorb or inject reactive power into the load. The Diesel UPS System or module stores energy in the Flywheel by use of a suitable recharging mechanism, normally fed from a utility power source. The flywheel energy is utilized to power the Critical Load through the MG upon the onset of an out of tolerance condition of the incoming power and for the duration of the time it takes to start the Diesel Engine. The Diesel Engine-Generator takes over support of the Critical Load, and restores power to the Essential Load which was dropped at the start of the utility outage.

Additionally, when a Diesel UPS System is incorporated into an Isolated-Parallel configuration with one or more additional Systems, two more items are, generally, required:

1. An Inductive Reactor or IP Choke which is used to connect the Output Bus or Load Bus of the Diesel UPS System to one or more additional Diesel UPS Systems, either directly to their Output or Load Busses, or through a common synchronizing/paralleling bus, and which also is used to limit fault current into and out of the System.
2. A synchronizing/paralleling bus, herein referred to as an Iso-Parallel Bus or IP Bus, through which two or more independent Diesel UPS Systems can remain synchronized with each other and exchange power for the purpose of sharing loads.

For convenience, when like parts are identified in a parallel System, like reference characters are used; however, the reference characters of the parallel Systems will have one or more associated prime ("'") designators, depending on the number of parallel Systems. For example, in a two-module configuration, the like reference characters will have a single prime designation; 100', for example. In a three-module configuration, the like reference characters will have a double prime designation; 100", for example.

In accordance with an embodiment of the present invention, a two-module Iso-Parallel Configuration is shown in FIG. 1. Specifically, FIG. 1 is a functional/circuit block diagram of two electrically-coupled Diesel UPS Systems arranged in an Iso-Parallel Configuration, in accordance with an embodiment of the present invention. In FIG. 1, two electrically coupled Diesel UPS Systems 100, 100' are shown, each consisting of a standard Diesel Engine (DE) and Generator (G) set 110, 110', a System Switchboard (SWB) 120, 120', a Motor-Generator (MG) 130, 130' coupled with a Flywheel Energy Storage mechanism (FW) 135, 135', and an in-line Inductive Reactor (UPS Choke) 140, 140'. The System Switchboard 120, 120', which may have several different embodiments, generally accepts power from two sources, the Utility Service Transformer (Service Transformer) 145, 145' and the Diesel Engine-Generator 110, 110', and switches power to Essential Loads 150, 150' (e.g., short-break loads) and the UPS Choke/MG/Flywheel portion 160, 160' of the Diesel UPS System 100, 100'. The output of the Diesel UPS Systems 100, 100' are connected to dedicated UPS Output Busses 170, 170' which in turn serve Critical Load Busses ("Load Busses") 180, 180' to which Critical Loads 185, 185' (e.g., no-break loads) may be connected. The UPS Output Busses 170, 170' may incorporate an alternate input circuit 190, 190' fed directly from the System Switchboard 120, 120'. An Alternate Input (ALT FDR) Breaker 192, 192' on the Output Busses 170, 170' and an Input Switch 122, 122' in series with the UPS Chokes 140, 140' may act as a transfer mechanism (XFR) for switching each associated Diesel UPS System 100, 100' between the Utility Service Transformer 145, 145' and Diesel Engine-Generator 110, 110' power sources. An isolating paralleling Inductive Reactor (IP Choke) 195 is connected across two Diesel UPS System Load Busses 180, 180'. Properly sized and protected, the IP Choke 195 may operate to allow UPS output currents to flow through it, but prevent a fault occurring on one of the Critical Load Busses (Load Bus) 180, 180' from depressing the voltage on the other Load Bus 180, 180' below acceptable values. Accordingly, UPS output power is shared between the Systems 100, 100', but faults are isolated to one System. Alternatively, a shorting circuit 196 around IP Choke 195 may be used to allow the two Load Busses 180, 180' to be directly connected together. Load Bus Input Breakers 197, 197' receive UPS power from the Output Busses 170, 170' and work in conjunction with the normally open (N.O.) contacts of IP Choke Bypass Breaker 199 to form Bypass Transfer Pairs (BYP1 and BYP2), allowing one of the two Diesel UPS Systems 100, 100' to be taken out of service while the other Diesel UPS System 100, 100' is connected to both Load Busses 180, 180'.

Figure 2:
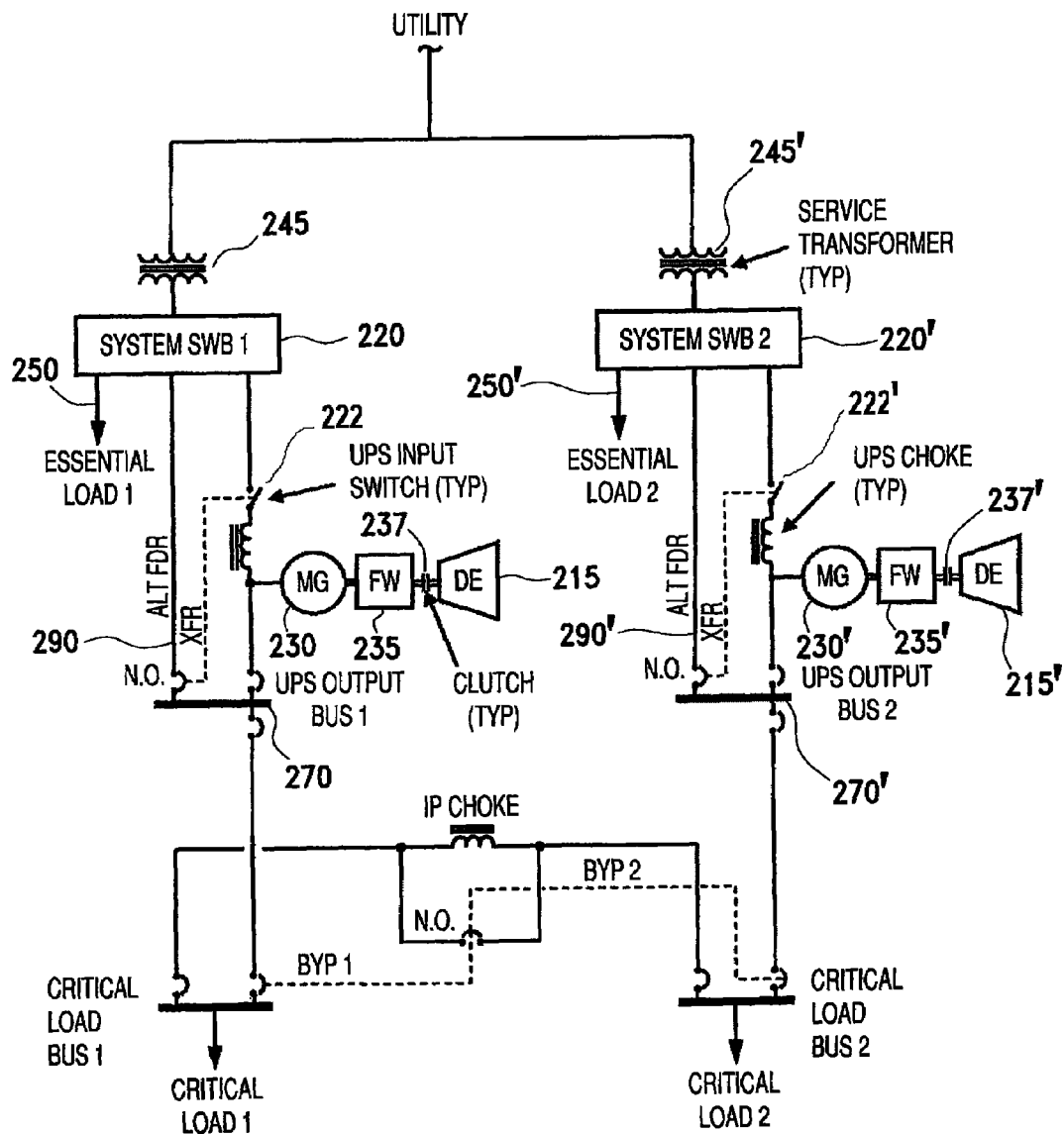
FIG. 2 is a functional/circuit block diagram of two mechanically-coupled Diesel UPS Systems arranged in an Iso-Parallel Configuration, in accordance with at least one alternate embodiment of the present invention.

FIG. 2 is a functional/circuit block diagram of two mechanically-coupled Diesel UPS Systems arranged in an Iso-Parallel Configuration, in accordance with at least one alternate embodiment of the present invention. The embodiment of FIG. 2 employs mechanically-coupled Diesel UPS Systems in lieu of electrically-coupled Diesel UPS Systems, as shown in FIG. 1. The Diesel Engine and Generator 110, 110' feeding the System Switchboard, as shown in FIG. 1, may be removed or disconnected, and a Diesel Engine 215, 215' may instead be connected to the Motor-Generator 230, 230' and Flywheel 235, 235' assembly through an automatic Clutch 237, 237'. The general arrangement of all other components remains the same as in FIG. 1, with the exception of an Alternate Input Feeder (ALT FDR) 290, 290' at each UPS Output Bus 270, 270' which now feeds power from the Motor-Generator 230, 230' backwards through the System Switchboard 220, 220' to Essential Loads 250, 250' when utility power 245, 245' is not available.

Modes of Operation. In accordance with one or more embodiments of the present invention, as part of an Iso-Parallel Configuration as herein described, the control system for each Diesel UPS System is generally capable of operating in any of the following modes of operation.

Normal Mode. During normal operation the Diesel UPS System may accept utility power and route it to the UPS Choke. All Diesel UPS Systems may be served from the same utility power source, i.e., the primary input to all Utility Service Transformers may be fed from the same utility distribution bus. The UPS Choke working in conjunction with the Synchronous Motor-Generator or Induction Motor-Generator (as appropriate) advantageously provides precise regulated and transient free power to the System's dedicated Critical Load. The Diesel UPS System may also pass unregulated power directly to its dedicated Essential Load via the System Switchboard. A Flywheel recharge mechanism, which is part of the Flywheel assembly 235, 235', maintains the flywheel at its normal operating speed to drive the Motor-Generator 230, 230'. During this mode, the Diesel Engine 215, 215' is normally idle.

Flywheel Mode. Upon failure of the utility power, the UPS Choke Input Switch 222, 222' opens to immediately disconnect the Choke input from the System Switchboard 220, 220'. The Motor-Generator (MG) 230, 230' then immediately accepts the System's Critical Load 285, 285' from the failed utility. The System's Essential Load 250, 250' is disconnected from utility power within the System Switchboard. The Flywheel assembly 235, 235' will then continue to supply the required energy to support the MG 230, 230' for the time required to start the dedicated Diesel Engine as a backup power source.

Diesel Mode. As soon as the Diesel Engine 215, 215' is stable, Critical Load of the System will be transferred from the Flywheel assembly 235, 235' and MG 230, 230' power source to the Diesel Engine 215, 215' and MG 230, 230' backup power source. For embodiments with electrically-coupled Diesel Engines, this may be accomplished through the Alternate Feeder Transfer Breakers (XFR) as described in connection with FIG. 1. In the Diesel mode, power may be supplied through the Alternate Feeder 190, 190' path to the Critical Load 185, 185' and "back fed" into the MG 130, 130' assembly. Critical Load and the MG may be fed in parallel to maintain the MG 130, 130' operating as a synchronous condenser. For embodiments with mechanically-coupled Diesel Engines (e.g., FIGS. 2 and 4) this may be accomplished by engaging a Diesel Engine Clutch 237, 237', thereby relieving the associated Flywheel assembly 235, 235' of the Critical Load. After a few seconds the Essential Load, generally, will be re-energized with Diesel power. For embodiments with electrically-coupled Diesel Engines (e.g., FIG. 1) this may be accomplished by re-connecting the Essential Load 150, 150' within the System Switchboard 120, 120'. For embodiments with mechanically-coupled Diesel Engines (e.g., FIGS. 2 and 4) this may be accomplished by re-energizing the System Switchboard 220, 220' from the MG 230, 230' via the Alternate Feeder (ALT FDR) 290, 290'. While in Diesel Mode, the Diesel UPS System will generally operate with a droop frequency/power characteristic for load sharing with other Systems. For the duration of the utility power absence the System may continue to operate on backup Diesel Engine power.

Mixed Mode. During re-transfer operations, when the System Switchboard is re-synchronized with the newly restored utility and the loads are switched back to utility power, or during mixed operation when some Systems are on utility power and some are on diesel power, all Systems connected to an IP Bus (e.g., FIG. 3) may operate in Mixed Mode. In this mode the Diesel UPS System 300, 300', 300" may operate with an isochronous frequency/power characteristic. While in this mode the Diesel UPS System may be controlled by a common Master Load Controller (an independent controller connected to all Diesel Engines operating on the IP Bus) and/or an alternate Pilot Wire system, described below, to insure proper load control and transfer sequencing during re-transfers to utility power.

Diesel Failure Mode. A Diesel UPS System 300, 300', 300" connected to an IP Bus 355 in an Iso-Parallel Configuration has the ability to operate without utility power or diesel engine backup. In this mode the Diesel UPS System may continue to operate and regulate its Output Bus 370, 370', 370" voltage with power drawn from other Systems through the IP bus 355. In this mode, Essential Loads 350, 350', 350" are generally not supported.

Bypass Mode. For the purpose of taking the Diesel UPS System 300, 300', 300" out of service for maintenance, the Critical Load 385, 385', 385" may be manually transferred from the UPS Choke output 340, 340', 340" to an alternate power source without an interruption. Re-transfer of the Critical Load back to the Diesel UPS System output may also be accomplished without an interruption. Bypass mode may also be automatically selected when an internal failure of the Flywheel and MG assembly is detected or when an overload is detected. The bypass transfer and re-transfer operations may take place at the Critical Load Bus 380, 380', 380" with Main and Alternate Breakers (BYP) controlled by the System. The bypass power source is generally the Iso-Parallel (IP) Bus 355. The bypassed Critical Loads may be distributed among all other Systems connected via their IP Chokes 395, 395', 395" to the IP Bus 355. For embodiments of the Simplified Iso-Parallel Configuration (e.g., FIGS. 5 and 6), the bypass power source may be the System Switchboard 520, 520', which may be on Diesel Engine-Generator 510, 510' power (for electrically-coupled Diesels) or utility power, if present.

Island Mode. When the Diesel UPS System 300, 300', 300" is not connected to the IP Bus 355 and/or does not have the IP Bus available to it due to maintenance procedures, the System may operate in a stand-alone mode in which it alone serves its associated loads and does not share output power with other Systems. In this mode the bypass of the Critical Load 385, 385', 385" to the IP Bus 355 (BYP) may be restricted. However, transfer of Critical Load to the utility source via the Alternate Feeder (as in the Bypass Mode for the Simplified Configuration, e.g., FIG. 5) may be possible as an alternate bypass operation.

Load Control Characteristics. When Diesel UPS Systems are arranged in an Iso-Parallel Configuration and share an IP Bus, the Diesel Engine-Generators and Flywheel/MG assemblies generally will, for various Operating Modes, have one of three load control characteristics described below. These load control characteristics may be a function of the Diesel Engine governor, Generator voltage regulator, Flywheel power transfer controller, and MG voltage regulator, which generally work in a fashion to equalize Critical Load on the IP Bus-connected Systems and to not overload any System or back feed into the utility.

Isochronous Load Control. When in Normal Mode the Diesel UPS Systems generally will, by definition, be operating isochronous with the utility, and load sharing may occur naturally by virtue of the ratios of UPS Choke and IP Choke impedances. When in Island Mode the Diesel UPS System may operate in an isochronous manner. The System may synchronize its Output Bus with the utility (if the utility is available) or the IP Bus, depending on the embodiment of the bypass controls used. Power sharing with other modules is not typically done in Island Mode.

Iso-Droop Load Control. The Diesel Engine controls in each of the Diesel UPS Systems within an Iso-Parallel Configuration generally have the ability to communicate with a Master Load Controller for the purpose of controlling the Diesel Engine-Generators as a group during re-transfers from diesel power to utility power, or for operation in a condition where some Systems are being fed from utility power and the others are on diesel power. This is generally referred to as Mixed Mode. Under this control characteristic all engine governors typically operate with an isochronous characteristic, with frequency and power sharing being controlled from the Master Load Controller to make the transfers in a manner to minimize load steps on the utility, prevent back feed into the utility, and to prevent the temporary overloading of any Diesel Engine in the transfer process. In the absence of communication with the Master Load Controller, the Diesel Engine output requirement may be set proportional to the phase angle between the utility voltage and the voltage on the IP bus per pre-programmed instructions at the System's local logic controller. The iso-droop load control characteristic may be manually selected as the preferred load control characteristic.

Droop Load Control. In Diesel Mode the common Master Load Controller is, generally, not active unless manually engaged, and all Diesel Engines generally act independently to select their speed and power output according to a preprogrammed droop (power per Hertz) characteristic. All Systems in a group may naturally synchronize through their connections to the IP Bus. All Systems may be free to adjust their phase relationship with the IP Bus, in order to import or export power to and from the IP Bus as required to satisfy the Critical Loads. As all Systems are held in synchronization by the IP Bus, all Systems will, generally, output an equal amount of power.

Figure 3:
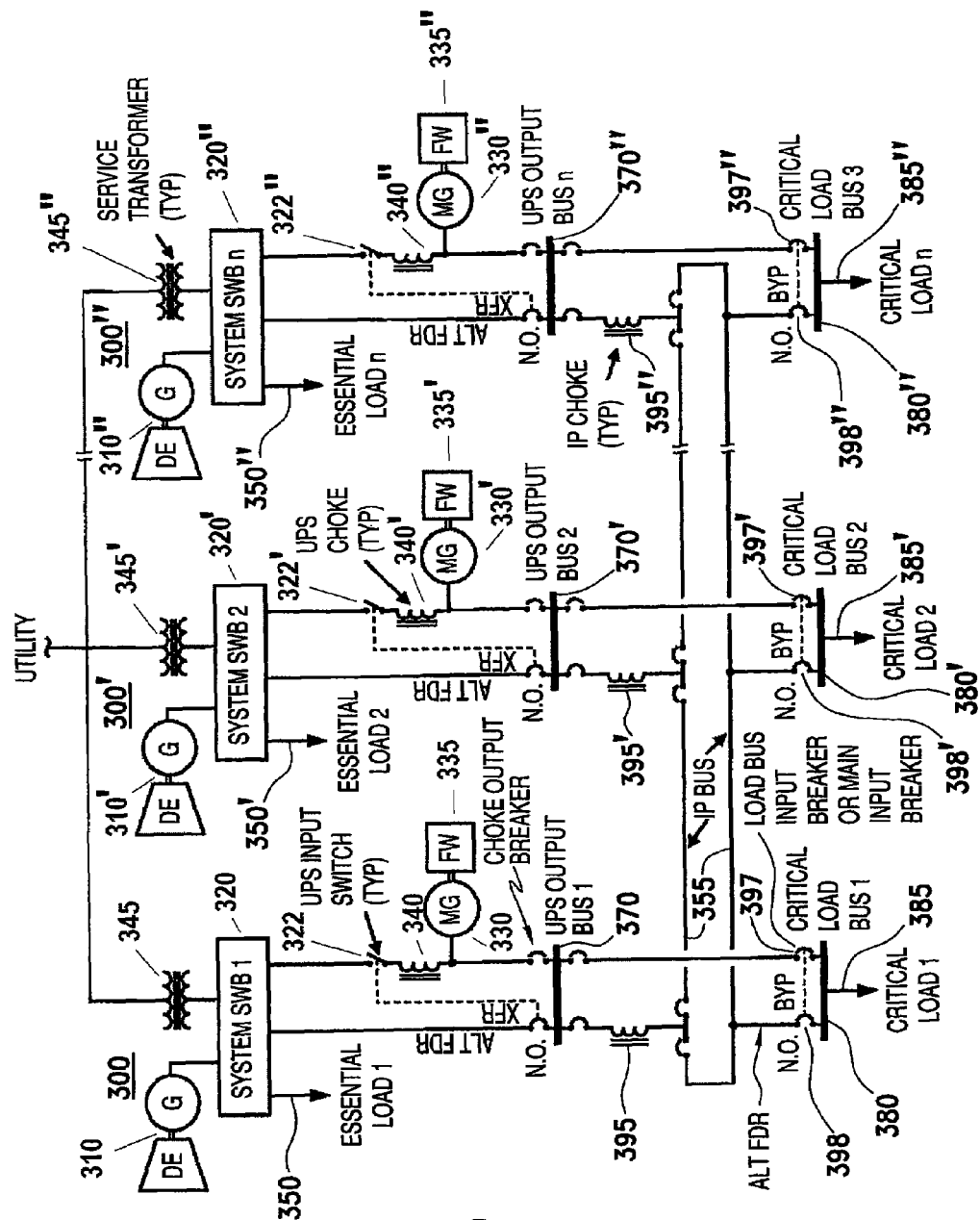
FIG. 3 is a functional/circuit block diagram of an Iso-Parallel Configuration of three or more electrically-coupled Diesel UPS Systems, in accordance with at least one alternate embodiment of the present invention.

FIG. 3 is a functional/circuit block diagram of an Iso-Parallel Configuration of three or more electrically-coupled Diesel UPS Systems, in accordance with at least one alternate embodiment of the present invention. The components of the individual Diesel UPS Systems or modules are the same as those shown in FIG. 1 except for the configuration of the IP Chokes. In the embodiment of FIG. 3, the UPS Output Bus 370, 370', 370" of each System is connected to a common synchronizing Iso-Parallel Bus (IP Bus) 355 through a corresponding dedicated IP Choke 395, 395', 395". The IP Bus itself may have many different configurations. In the embodiment shown in FIG. 3, the IP Bus is arranged in a loop and segmented with breakers so that a fault on any portion may be isolated while leaving the rest of the loop intact and paralleling all Systems unaffected by the fault. The Load Bus Input Breaker 397, 397', 397" receiving UPS power from the Output Bus 370, 370', 370" of each System 300, 300', 300" may work in conjunction with a normally open (N.O.) Alternate Input Breaker 398, 398', 398" at the Load Bus 380, 380', 380" to form a Bypass Transfer Pair (BYP). When any System's Bypass is operated, the Critical Load 385, 385', 385" for that System may be placed on the IP Bus 355 and distributed among all the Systems 300, 300', 300" connected to the IP Bus through their IP Chokes 395, 395', 395". In normal operation, the Critical Loads 385, 385', 385" on the Load Busses 380, 380', 380" are typically distinct from each other. Load sharing among the Diesel UPS Systems may occur at the UPS Output Busses 370, 370', 370". Properly sized and protected IP Chokes 395, 395', 395" may let UPS output currents flow from Output Bus to Output Bus as required to satisfy the Critical Loads 385, 385', 385", but will typically prevent a fault on one Output Bus from depressing the voltage on the other Output Busses below acceptable values. The Essential Loads 350, 350', 350" in this embodiment may be treated in the same manner as in the embodiment shown in FIG. 1.

Figure 4:
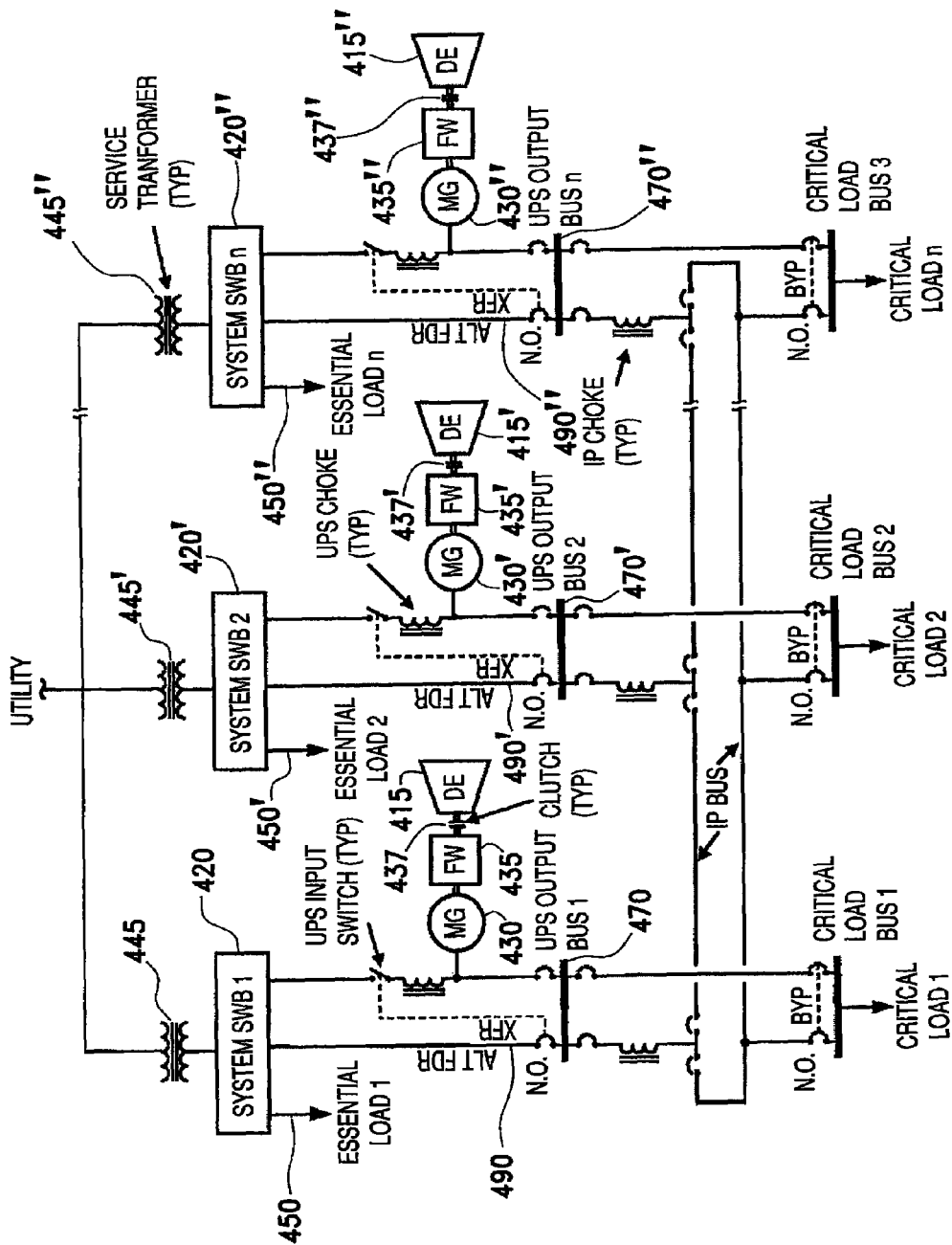
FIG. 4 is a functional/circuit block diagram of an Iso-Parallel Configuration of three or more mechanically-coupled Diesel UPS Systems, in accordance with at least one alternate embodiment of the present invention.

FIG. 4 is a functional/circuit block diagram of an Iso-Parallel Configuration of three or more mechanically-coupled Diesel UPS Systems, in accordance with at least one alternate embodiment of the present invention. As described in FIG. 2, in FIG. 4, the Diesel Engine and Generator 110, 110' may be removed, or disconnected, from the System Switchboard 420, 420', 420", and the Diesel Engine 415, 415', 415" may instead be connected to the MG 430, 430', 430" and Flywheel 435, 435', 435" assembly through an automatic Clutch 437, 437', 437". Also as described in FIG. 2, in FIG. 4, the Alternate Input Feeder (ALT FDR) 490, 490', 490" at each UPS Output Bus 470, 470', 470" may now feed Diesel Engine 415, 415', 415" power backwards to its System Switchboard 420, 420', 420" to serve Essential Loads 450, 450', 450" when utility power 445, 445', 445" is not available.

Exemplary Sequence of Operations. As an example of how Diesel UPS Systems operate in an Isolated-Parallel Configuration, a Sequence of Operation for an n-module embodiment of IP using electrically-coupled Diesel UPS System (e.g., as shown in FIG. 3) is described below.

Normal Mode. In Normal Mode all Diesel UPS Systems 300, 300', 300" generally accept utility power from the Service Transformers 345, 345', 345" via the System Switchboard 320, 320', 320". Power for Critical Loads 385, 385', 385" may be routed to the UPS Chokes. UPS Input Switches are typically closed. Critical power may be conditioned as it passes through the UPS Chokes 340, 340', 340", and the voltage may be adjusted with the Motor-Generators (MG) 330, 330', 330" by injecting positive or negative reactive power (VARS) into the Output Bus 370, 370', 370" by automatic manipulation of their excitation controls. The MGs 330, 330', 330" may act as motors to keep the Flywheels charged with inertial energy via their recharge mechanisms. The IP Chokes 395, 395', 395" are also connected at the Output Busses 370, 370', 370", and power may flow into or out of any Output Bus from/to the IP Bus 355. The amount of power that flows through the IP Choke 395, 395', 395" may be determined by the relative phase angle of the voltages on either side of the IP Chokes. Those phase angles may be determined by the phase shift of the utility power flow as it passes through the UPS chokes 340, 340', 340"; the higher the power flow the more the phase shift. In this way the more heavily loaded Diesel UPS Systems 300, 300', 300" may import power from the IP Bus 355, while the more lightly loaded Diesel UPS Systems may export their excess power into the IP Bus. At the UPS Load Busses the Bypass Breakers (BYP) may be arranged to accept power from the UPS Output Busses, and not from the IP Bus. Power for Essential Loads 350, 350', 350" may be delivered directly to them from the utility source via the System Switchboard 320, 320', 320".

Flywheel Mode. Upon utility power failure each Diesel UPS System 300, 300', 300" may go to Flywheel Mode and the MG 330, 330', 330" may immediately take up the System's Critical Load 385, 385', 385". The Flywheel may deliver stored energy to the MG 330, 330', 330" which may act as a generator to support the Critical Load. The UPS Choke 340, 340', 340" may limit the amount of power that can back feed into a faulted utility. The UPS Input Switch 322, 322', 322" may immediately be opened to isolate the UPS Choke 340, 340', 340" from the System Switchboard 320, 320', 320" and stop any power from flowing into the utility. The Flywheel 335, 335', 335" may discharge its energy in a controlled way to keep the MG 330, 330', 330" at proper speed. The MG may go into Droop Load Control. All Flywheels may be held in synchronization because they are all connected to the IP Bus 355 through their IP Chokes 395, 395', 395". Therefore, in Droop Load Control all Flywheels 335, 335', 335" may have the same power output, which is generally the total of all Critical Loads 385, 385', 385" divided by the number of MG/Flywheels sharing the IP Bus 355. Differences between the power output of the MG and the Critical Load on each System Load Bus 380, 380', 380" may be made up through the IP Choke. It may be an automatic function of the Droop Control of each MG/Flywheel to adjust its phase angle relative to the IP Bus 355 to import or export power from/to the IP Bus through the IP Choke 395, 395', 395" as necessary. Essential Loads 350, 350', 350" may be temporarily disconnected. During the spin-down time of the Flywheel 335, 335', 335" a signal may be sent to the Diesel Engine in each System to start. When the Diesel Engine-Generator 310, 310', 310" is stabilized, usually within 10 seconds of the utility disturbance, the System may go to Diesel Mode.

Diesel Mode. In Diesel Mode the Diesel Engine-Generator 310, 310', 310" may supply power to its associated System Switchboard 320, 320', 320" replacing the absent utility power. Diesel power may be directed to the UPS Output Bus 370, 370', 370" via the Alternate Feeder (ALT FDR) in each System by virtue of the Alternate Input Transfer (XFR). The UPS Input Switch 322, 322', 322" may remain open. Diesel power may now support the Critical Load 385, 385', 385", and also keeps the MG 330, 330', 330" energized. In some embodiments of Iso-Parallel Configuration, the Flywheel recharge mechanism may be re-energized by diesel power through the MG 330, 330', 330" at this time. In other embodiments the Flywheel 335, 335', 335" may not recharge until utility power returns and the recharge mechanism is re-energized from the System Switchboard 320, 320', 320". While in Diesel Mode the MG 330, 330', 330" may go to Droop Load Control. Power sharing among all Diesel UPS Systems 300, 300', 300" may occur in a similar manner as with the MG/Flywheel assemblies in Flywheel Mode. The loading on the Diesel Engine-Generators 310, 310', 310" may be balanced by power exchanges through the IP Chokes 395, 395', 395" and IP Bus 355. The Essential Loads 350, 350', 350" may be reconnected after the Diesel Engines stabilize with the Critical Loads 385, 385', 385".

Mixed Mode. When utility power returns, the Diesel UPS Systems 300, 300', 300" may receive a command to return all loads to their normal power sources. The command may be automatically initiated internally after an adjustable time period or manually initiated by an operator. In order to return loads to the utility, which is operating at an inflexible frequency, each Diesel UPS System, generally, must enter Mixed Mode and go to Iso-Droop Load Control to perform a re-transfer. In Mixed Mode, all Systems may be controlled by Master Control Logic to synchronize with the newly restored utility, while keeping Diesel Engine power output the same as if the Systems were still in Droop Load Control. Under such control, the Diesel UPS Systems 300, 300', 300" may share power through the IP Bus 355, continue to serve Critical Loads 385, 385', 385" that may not be evenly distributed, synchronize with the utility, and still maintain uniform Diesel power output. Critical Loads may be returned to utility power by re-transferring the Alternate Feeder/UPS Input Switch pair (XFR) in a no-break fashion. Essential loads 350, 350', 350" may be re-transferred from diesel power to utility power within the System Switchboard 320, 320', 320". In different embodiments, the Essential Load re-transfers may be open or closed transitions, and may take place before or after the Critical Loads are returned to utility power. After the re-transfers are made Diesel UPS Systems may be returned to Normal Mode, and the Diesel Engines may run for a short cool-off period and then shut down.

Diesel Failure Mode. If a Diesel Engine fails to start on command during a utility outage, the failed Diesel Engine-Generator 310, 310', 310" may be isolated at the System Switchboard 320, 320', 320", and the Diesel UPS System 300, 300', 300" will go into Diesel Failure Mode. Both the UPS Input Switch 322, 322', 322" and the Alternate Feeder Breaker at the Output Bus typically remain open. In this mode the MG 330, 330', 330" continues to run and produces volt-amperes reactive (VARs) as required to regulate Critical voltage, but it does not produce real power after the Flywheel 335, 335', 335" is exhausted. Power for the Critical Load 385, 385', 385" may now be delivered from the IP Bus 355 through the IP Choke 395, 395', 395". The missing diesel power may be made up by all the remaining Diesel Engines connected to the IP Bus 355. Essential loads 350, 350', 350" may be shed, or may be transferred to other Systems 300, 300', 300" with downstream switching mechanisms.

Bypass Mode. If the MG 330, 330', 330"/Flywheel 335, 335', 335" assembly should fail, or be unable to regulate the critical Output Bus 370, 370', 370" voltage, the System 300, 300', 300" may make a transition to Bypass Mode. The Diesel UPS System may enter this mode by transferring the Main Input Breakers 397, 397', 397" and Alternate Input Breakers (BYP) at the Load Bus in a no-break manner. The Bypass Mode may also be entered manually by an operator. In Bypass Mode, the Critical Load 385, 385', 385" may be placed on the IP Bus 355 and supported equally by all the remaining Systems 300, 300', 300" connected to the IP Bus. The Critical Load in bypass may no longer have the benefit of the MG 330, 330', 330" regulating its voltage and may operate at the IP Bus voltage which may be less than the nominal value at an Output Bus 370, 370', 370". The amount of voltage depreciation may depend on the ratio of bypassed Critical Load to the total of all Critical Loads in the IP Configuration. Proper design of the IP Configuration may keep the IP Bus voltage within an acceptable range for the Critical Loads 385, 385', 385". Return from Bypass Mode may be accomplished by re-transferring the Bypass Breaker pair (BYP).

Island Mode. If the IP Choke Input Breaker opens in any Diesel UPS System 300, 300', 300", the System may go to Island Mode. In this mode, generally, the System is no longer connected to the IP bus 355 and is no longer part of the Isolated-Parallel Configuration. The Diesel UPS System continues to serve its Essential and Critical Loads, but without the benefit of redundancy from the other Systems 300, 300', 300". Overloads on the System may result in the shedding of Essential Load 350, 350', 350" and/or Critical Load 385, 385', 385", as appropriate. In some embodiments of IP Configuration, Island Mode allows for the Critical Load to be bypassed to utility or diesel power upon failure of the MG 330, 330', 330"/Flywheel 335, 335', 335" assembly, which would be accomplished by closing the Alternate Feeder Breaker and opening the Choke Output Breaker at the Output Bus 370, 370', 370". In other embodiments automatic bypass to the IP Bus may be possible.

In cases where the IP Bus 355 is not available for bypass power (e.g., the portion of the IP Bus from which bypass power is served may be faulted or under maintenance), and/or the Diesel UPS System's Bypass Transfer (BYP) is inhibited, but the System's Output Bus 370, 370', 370" is still connected to the IP Bus and sharing power, the Diesel UPS System 300, 300', 300" may enter the following Operating Modes:

1. When utility power is available the Diesel UPS System will generally be in Normal Mode. If a Diesel UPS System becomes overloaded, it may go to Island Mode and either shed load or bypass load to utility power via the Alternate Feeder.
2. When some Systems are on utility and some are on diesel power, the System will generally be in Mixed Mode and operating with Iso-Droop Load Control. If an overload occurs in this mode, the Diesel UPS System may shed its Essential Load. If the overload persists the Diesel UPS System may go to Island Mode and bypass to utility or diesel power as appropriate.
3. When utility is not available the Diesel UPS System will generally be in Flywheel or Diesel Mode and operating with Droop Load Control. If an overload occurs, the Diesel UPS System may shed its Essential Load.

Different manufacturers of Diesel UPS Systems may have slightly different operation procedures, and there may be alternate procedures for mechanically-coupled Diesel UPS Systems (e.g., as shown in FIG. 4). These operation sequences may also differ slightly for the simplified configurations shown in FIGS. 5 and 6.

Figure 5:
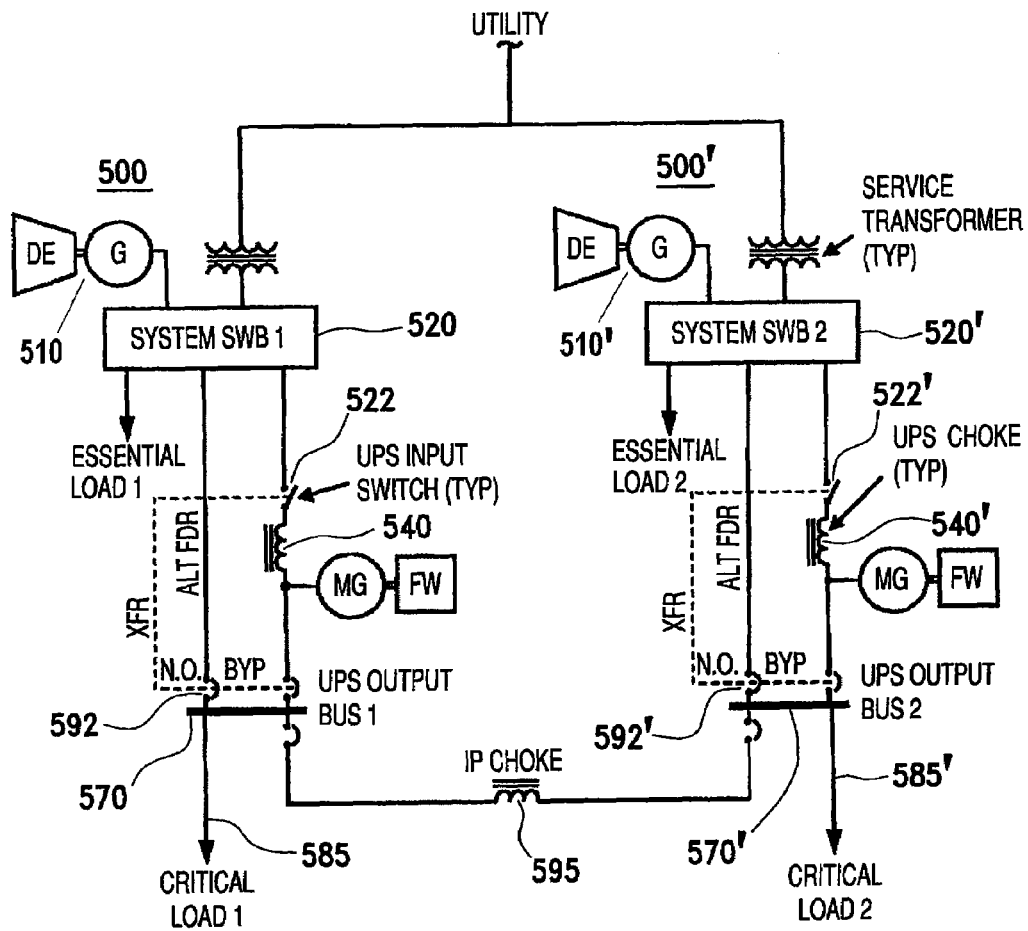
FIG. 5 is a functional/circuit block diagram of a simplified Iso-Parallel Configuration of two electrically-coupled Diesel UPS Systems, in accordance with at least one alternate embodiment of the present invention.

FIG. 5 is a functional/circuit block diagram of a simplified Iso-Parallel Configuration of two electrically-coupled Diesel UPS Systems, in accordance with at least one alternate embodiment of the present invention. In the embodiment of FIG. 5, the Critical Loads 585, 585' are connected directly to the UPS Output Busses 570, 570'. The IP Choke 595 is also connected between the Output Busses 570, 570'. A major difference between this embodiment and that of FIG. 1 is the Bypass function (BYP). In the event of a System fault, the normally open (N.O.) Alternate Input Feeder (ALT FDR) Breaker 592, 592' on the Output Busses and an Input Switch 522, 522' on the UPS Chokes 540, 540' may act as a transfer mechanism (XFR) for transferring the Critical Load 585, 585' to the System Switchboard (SWB) 520, 520', in lieu of the opposite System 500, 500'. One System 500, 500' may bypass its Critical Load while the other Critical Load remains on Diesel UPS System Output. Both Critical Load sharing and fault isolation between UPS Output Busses 570, 570' may be maintained in this embodiment as they were in the embodiment shown in FIG. 1.

Figure 6:
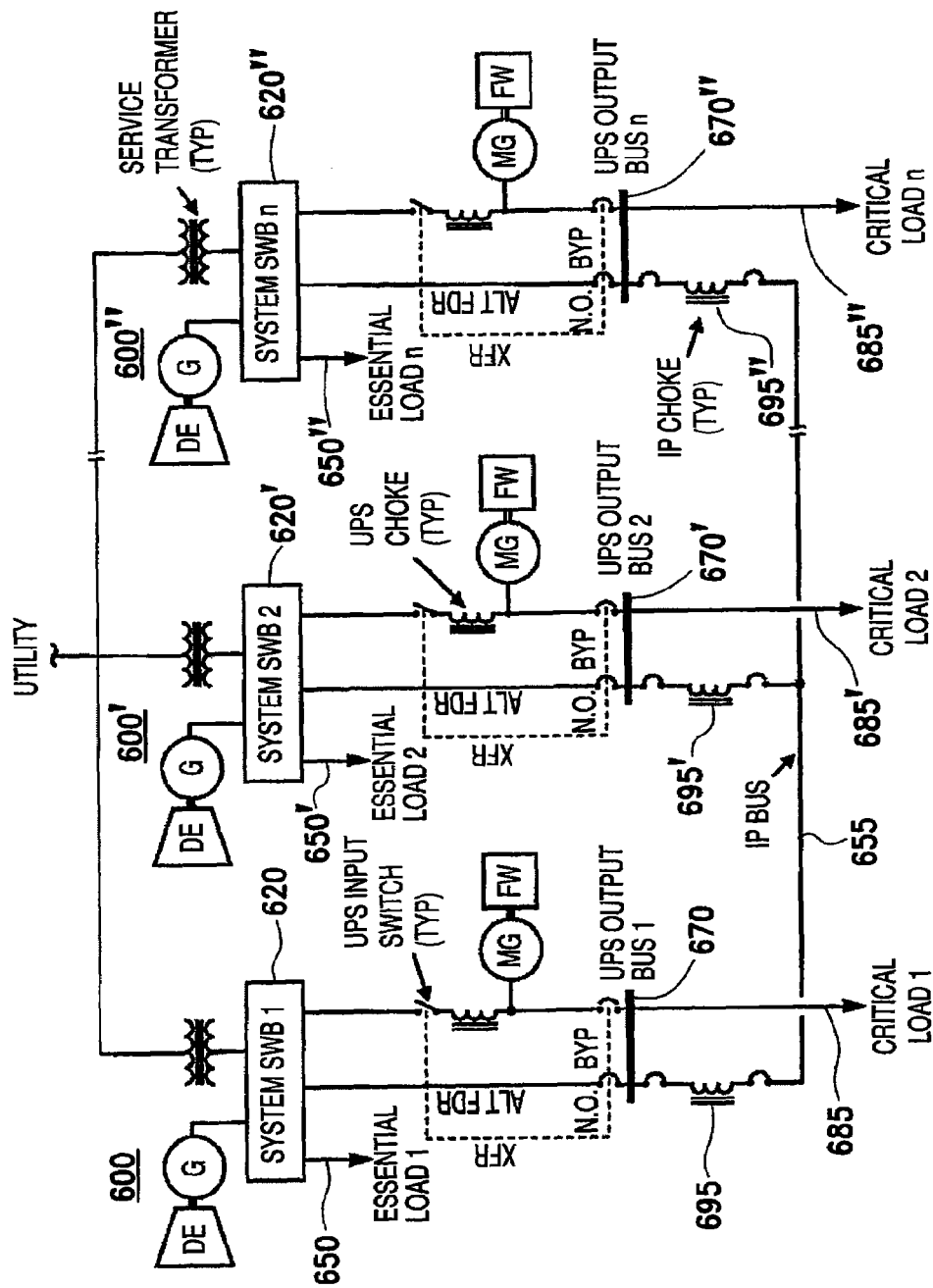
FIG. 6 is a functional/circuit block diagram of a simplified Iso-Parallel Configuration of three or more electrically-coupled Diesel UPS Systems, in accordance with at least one alternate embodiment of the present invention.

FIG. 6 is a functional/circuit block diagram of a simplified Iso-Parallel Configuration of three or more electrically-coupled Diesel UPS Systems, in accordance with at least one alternate embodiment of the present invention. The embodiment of FIG. 6 shows a simplified Iso-Parallel Configuration with three or more modules 600, 600', 600". As in the case of the embodiment shown in FIG. 5, in FIG. 6, the Critical Loads 685, 685', 685" are connected directly to the UPS Output Busses 670, 670', 670", and the Bypass function (BYP) transfer Critical Load to the System Switchboard 620, 620', 620". The IP Chokes 695, 695', 695" in this embodiment are also connected to the UPS Output Busses 670, 670', 670", and the IP Bus 655 is not typically configured in a loop, but rather in a "star radial" design. The simplified IP Configuration may offer an advantage of using fewer breakers and busses than used by the previous embodiments shown in FIGS. 3 and 4. However, a fault on the IP Bus 655 could cause the Diesel UPS Systems 600, 600', 600" to disconnect from it and lose the ability to share Critical Loads 685, 685', 685". If overloads were to occur under that condition, the Critical Load of the overloaded System could be transferred, or bypassed, to the System Switchboard 620, 620', 620", and the Essential Loads 650, 650', 650" could be shed or transferred to other Systems 600, 600', 600", if necessary.

Figure 7:
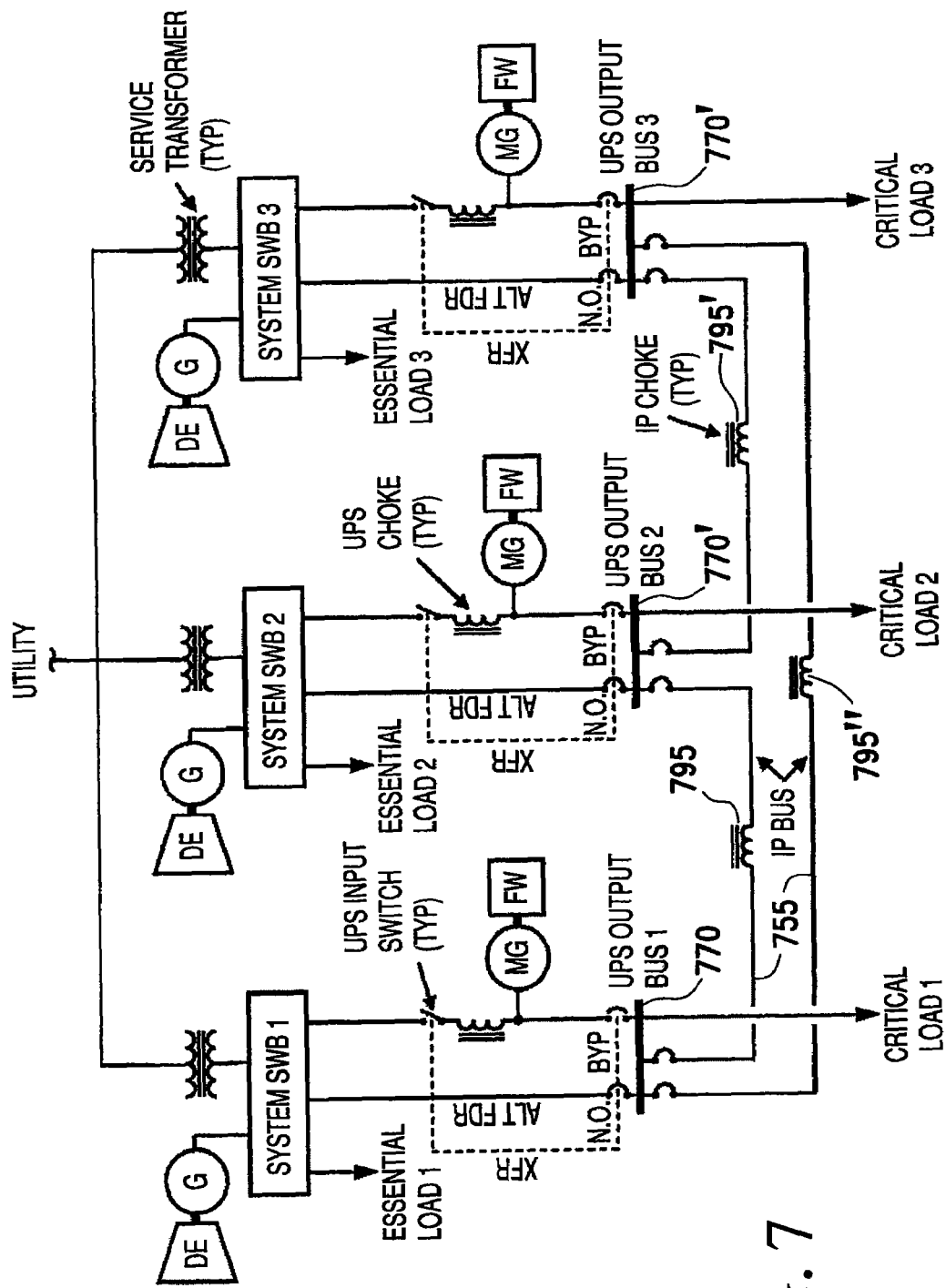
FIG. 7 is a functional/circuit block diagram of an alternate Iso-Parallel Configuration of three electrically-coupled Diesel UPS Systems, in accordance with at least one alternate embodiment of the present invention.

FIG. 7 is a functional/circuit block diagram of an alternate Iso-Parallel Configuration of three electrically-coupled Diesel UPS Systems, in accordance with at least one alternate embodiment of the present invention. In the embodiment of FIG. 7, the IP Bus 755 may be arranged in a loop with IP Chokes 795, 795', 795" segmenting the bus in lieu of radiating from a common bus and separating adjacent UPS Output Busses 770, 770', 770". Variations of this embodiment may have more than three Output Busses. Power sharing may occur in a manner similar to other embodiments described herein, though the power sharing may not occur as equally or stably as in other embodiments described herein.

Master Load Control Logic. Several embodiments of the Iso-Parallel Configuration may require a Master Load Control Logic to operate the Diesel UPS Systems properly during Mixed Mode. If any System in the IP Configuration is connected to an energized utility, the entire IP Configuration may be forced to operate at utility frequency. Customary droop load control may not possible. A common Diesel control logic may necessarily be provided for all Diesel UPS Systems in a group for the purpose of controlling the total Diesel power output of all Systems connected to the IP Bus during Mixed Mode operation. This Master Load Control Logic may reside in a stand-alone Master Load Controller, or be distributed within a set of Load Controllers embedded in the Systems. A communications network may be required to link the Master Load Control Logic with all Diesel UPS Systems.

The Master Load Controller(s) may automatically perform the following functions:

1. The Master Load Control may monitor the operating mode of each Diesel UPS System, the availability of utility power at each Diesel UPS System, the Critical Load on each Diesel UPS System, the status of the IP bus (continuous or divided by open breakers), the availability of the bypass power, and the total of all bypassed loads on the IP Bus. This information may be transmitted to all Diesel UPS Systems for use by their local control logic as necessary for proper operation.
2. Active load control for Mixed Mode and re-transfer execution may be accomplished in the Master Load Control Logic that sums the total Critical Loads of all Systems attached to the IP bus, and commands each system to produce at maximum its respective portion only. The individual Diesel Engines may be controlled as a group so as to not produce too much power, which could cause a reverse power flow into the utility at the Systems connected to their Service Transformers, and so as to not produce too little power, which could cause the Systems connected to the utility to overload.
3. The Master Load Control may also regulate how many Diesel UPS Systems are allowed to bypass to the IP Bus at one time. If more Systems attempt to go to Bypass Mode than the redundant capacity of the IP Configuration can accommodate, the Master Load Control Logic may inhibit the bypass operation. In the case of Systems requesting to go to Bypass Mode that cannot be accommodated on the IP Bus, those Diesel UPS Systems may be commanded to go to Island Mode.

Pilot Wire System. The IP Configuration may be a redundant configuration of Diesel UPS Systems free of single points of failure. The hardware housing the Master Load Control Logic could be implemented in such a way that a failure of one of its components would disable the Mixed Mode of operation of the IP Configuration. In embodiments of IP that use a non-redundant Master Load Control Logic hardware and communications network, a set of Pilot Wires may be provided to act as a backup in the event of failure of the Master Load Control hardware, or a disruption in the communications network.

A Pilot Wire may be a simple circuit using auxiliary contacts on breakers or other devices to energize a signal wire with voltage tapped from busses at certain places within the IP Configuration. Pilot Wires may be routed through all Diesel UPS Systems which, in turn, monitor the Pilot Wires for the presence of the signal voltage. The Pilot Wires may be energized by any System independently. Properly designed, a set of Pilot Wires allows each Diesel UPS System to work in all modes of operation and make appropriate control decisions without any direct communications between System controls and a Master Load Control Logic.

Diesel UPS Systems may also monitor the Pilot Wires for the phase angle of the signal voltage when a wire is energized. The difference in voltage phase angle between a Pilot Wire energized from the utility power source and one energized from the IP Bus is, generally, directly proportional to the sum total of all Critical Loads connected to the IP Bus when at least one System input is connected to the utility. This information may be used by independent System controls to set the Diesel Engine output power requirement in Mixed Mode. Generally, this phase angle relationship is instrumental in the Iso-Droop Load Control characteristic.

Figure 8:
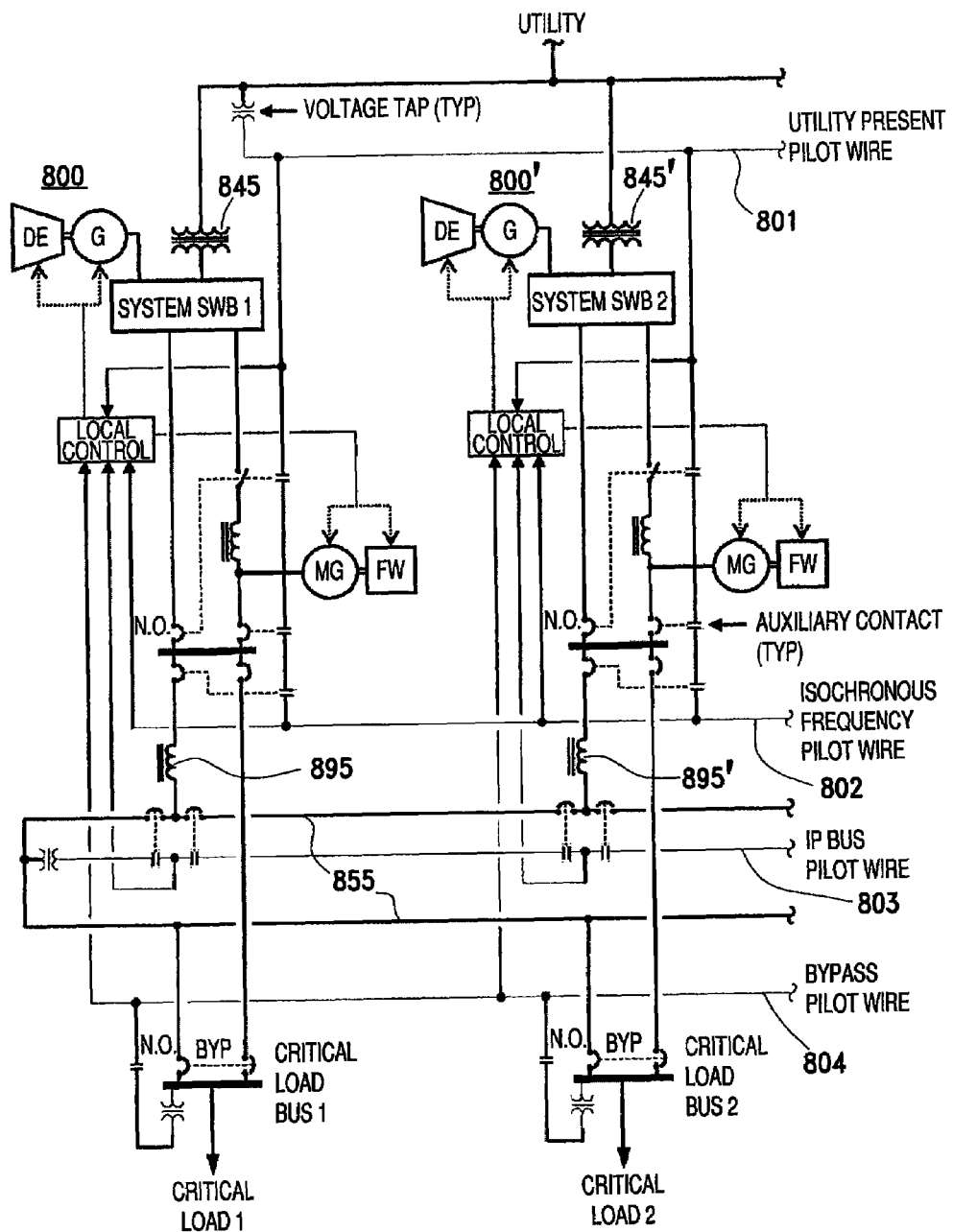
FIG. 8 is a functional/circuit block diagram of a Pilot Wire System for potential use with an Iso-Parallel Configuration, in accordance with at least one alternate embodiment of the present invention.

A backup Pilot Wire system may be made up of, but not necessarily limited to, one or more of the signal wire types described below. In the absence of digital communication with the Master Load Control Logic, each Diesel UPS System may operate properly based on analog voltage and phase angle information sensed on these Pilot Wires as indicated. A schematic diagram of a Pilot Wire system for a multiple electrically-coupled module IP Configuration is shown in FIG. 8.

Utility Present Pilot Wire. This type of signal wire is typically energized when utility power is present at any Service Transformer 845, 845'. If the Utility Present Pilot Wire 801 is energized, the Diesel UPS System may sense that utility power has returned to the site and then initiate a return to Normal Mode.

Isochronous Frequency Pilot Wire. This type of signal wire is typically energized when at least one Diesel UPS System is on utility power and connected to the IP Bus 855 through its IP Choke 895, 895', thereby forcing the IP Bus to operate at utility frequency. If the Isochronous Frequency Pilot Wire 802 is energized the System may go to Mixed Mode of operation and operate with an Iso-Droop Load Control characteristic. The load setting for the Diesel Engine is typically proportional to the phase angle difference between the Utility Present Pilot Wire 801 and the IP Bus Pilot Wire 804, as preprogrammed in the Systems controls.

IP Bus Pilot Wire. This type of signal wire is typically energized at each Diesel UPS System when that System's Bypass power source is electrically connected to the IP Bus 855, the IP Bus is continuous, and the IP Bus is energized. If the IP Bus Pilot Wire 803 is energized the System may sense that its Output Bus is connected to the IP+, that its bypass source is also energized from the IP Bus, and that the IP Bus is continuous with other Systems allowing normal bypass and power sharing functions. If the IP Pilot Wire is not energized the Diesel UPS System may go to Island Mode.

Bypass Pilot Wire. This type of signal wire is typically energized when any Diesel UPS System is in Bypass Mode, or when a pre-set number of Systems are is Bypass Mode. An energized Bypass Pilot Wire 804 may inhibit the Diesel UPS System from going to Bypass Mode.

FIG. 8 is a functional/circuit block diagram of a Pilot Wire System for potential use with an Iso-Parallel Configuration, in accordance with at least one alternate embodiment of the present invention. The embodiment of FIG. 8 may be used as a backup system to a central Master Control System for coordinated control of the Diesel UPS Systems 800, 800' in an IP Configuration. The Pilot Wire System shown typically has four signal wires common to all Systems 800, 800' that may be energized to indicate various system conditions. In particular: (1) the Utility Present Pilot Wire 801 may indicate utility power 845, 845' is present, (2) the Isochronous Frequency Pilot Wire 802 may indicate the IP Bus 855 is contiguous, (3) the IP Bus Pilot Wire 803 may indicate the IP Bus 855 is connected to utility through chokes 895, 895', and (4) the Bypass Pilot Wire 804 may indicate at least one System 800, 800' is in Bypass Mode. With this information, all Systems 800, 800' may act independently to transfer to and from all modes of operation without a central control. The Pilot Wire System may keep the IP Configuration free of single points of failure.

Essential Only IP Configurations. The invention of Iso-Parallel Configuration may be applied to groups of Diesel Engine-Generators that are not part of Diesel UPS Systems. Such embodiments of IP Configuration may be used in situations where only Essential Loads are being supported. The Essential Loads may consist of mechanical cooling equipment and normal building loads, for example, or it may also include the inputs to static UPS systems.

Figure 9:
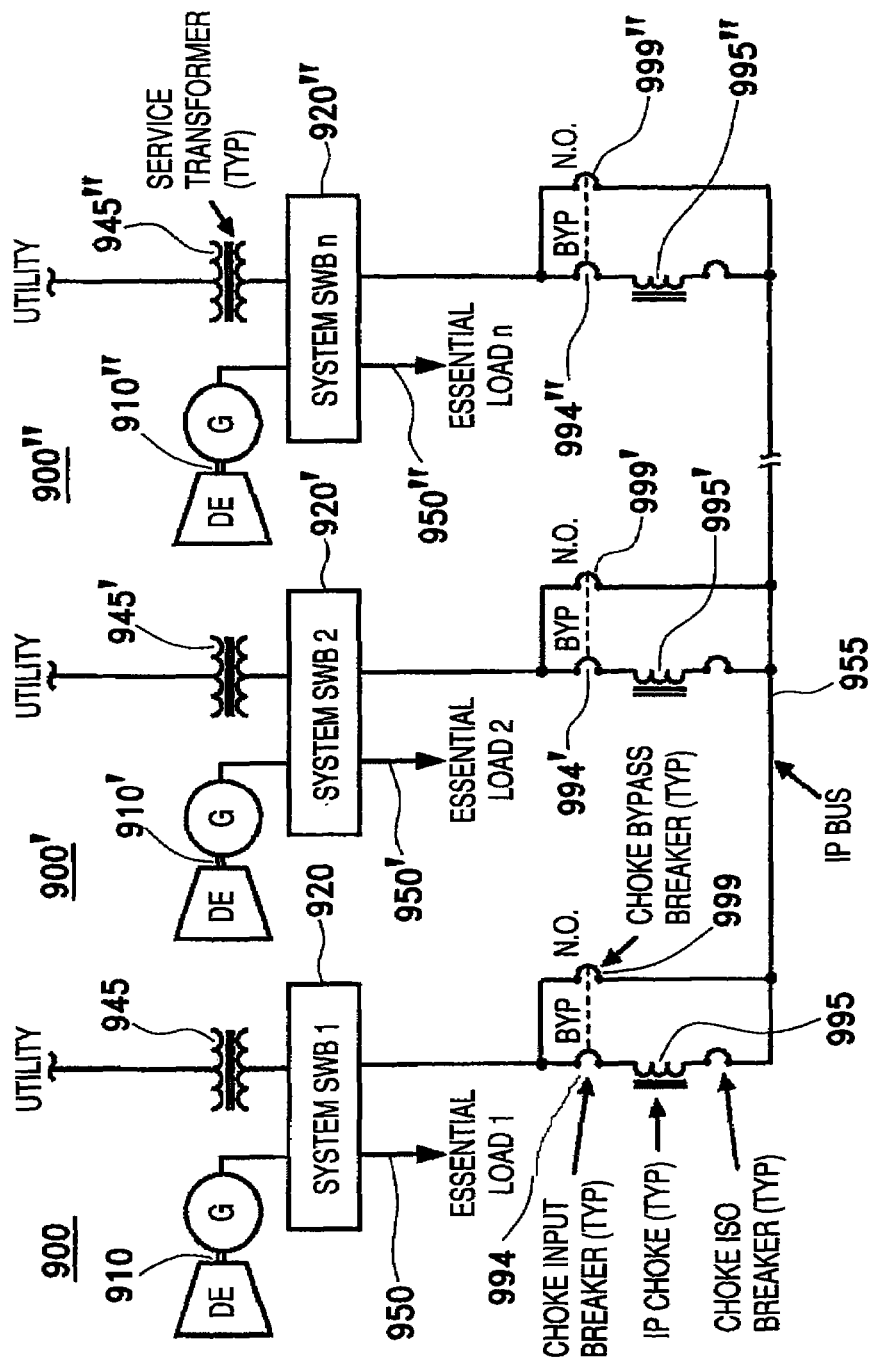
FIG. 9 is a functional/circuit block diagram of an Iso-Parallel Configuration of three or more Diesel Engine-Generators, in accordance with at least one alternate embodiment of the present invention.

FIG. 9 is a functional/circuit block diagram of an Iso-Parallel Configuration of three or more Diesel UPS Systems for potential use with Diesel Engine-Generators, in accordance with at least one alternate embodiment of the present invention. FIG. 9 shows a typical arrangement for an IP Configuration for Diesel Engine-Generators (EGs) 910, 910', 910" and Essential Loads 950, 950', 950". In this example the IP Chokes 995, 995', 995" may share power among the connected Diesel EGs 910, 910', 910" to equalize the loading on each generator. The IP Bus 955 may be energized and used only when the Diesel EGs 910, 910', 910" are engaged (Diesel Mode). While in Normal Mode the IP Bus 955 is typically de-energized.

The embodiment of FIG. 9 may be used for Essential Loads only. In this embodiment, the IP Bus 955 may be used to share power among Essential Loads 950, 950', 950" instead of Critical Loads. Generally, the IP Bus 955 is engaged only when the System Switchboards 920, 920', 920" are being powered from Diesel Engine-Generators 910, 910', 910", and disconnected when the Switchboards 920, 920', 920" are on utility power 945, 945', 945". Since all loads are short-break loads, all transfers to and from utility 945, 945', 945", and the engagement and disengagement of the IP Bus 955, may be open transition. In the event of failure of a Diesel Engine-Generator 910, 910', 910", the System 900, 900', 900" may go into Bypass Mode, in which the Bypass Transfer (BYP) Breaker Pair—the Choke Input Breaker 994, 994', 994" and the Choke Bypass Breaker 999, 999', 999", for example—may shift the Switchboard 920, 920', 920" loads directly to the IP Bus 955 where the loads could be shared by all other connected Diesel Engine-Generators 910, 910', 910".

A typical Sequence of Operation for an Essential-Only IP Configuration is as follows.

Normal Mode. In Normal Mode all System Switchboards 920, 920', 920" may accept utility power from the Service Transformers 945, 945', 945" and deliver it to the Essential Loads 950, 950', 950". Generally, the Diesel Engine-Generators 910, 910', 910" are stopped. The connections to the IP Chokes 995, 995', 995" at the Switchboards are typically open, and no power flows through the IP Bus 955.

Diesel Mode. Upon utility power failure, the Diesel Engine-Generators 910, 910', 910" may be started. The first Diesel Engine-Generator (EG) to stabilize may energize the IP Bus 955 by connecting the IP Choke 995, 995', 995" at that System Switchboard 920, 920', 920". All subsequent Diesel EGs may synchronize to the energized IP Bus 955 and close the IP Choke 995, 995', 995" connections at their Switchboards. At each System Switchboard 920, 920', 920" the Essential Loads 950, 950', 950" may remain de-energized until the IP Choke 995, 995', 995" is connected. When the Diesel EG 910, 910', 910" and IP Choke are connected to the Switchboard the Essential Load 950, 950', 950" may be re-supplied with diesel power. While in Diesel Mode the Diesel EGs typically go to Droop Load Control and power sharing occurs among all Diesel EGs. The loading on the Diesel Engine-Generators may be balanced by power exchanges through the IP Chokes 995, 995', 995" and IP Bus 955. When utility power returns, the Essential Loads 950, 950', 950" may be disconnected from diesel power and reconnected to utility power in an open transition.

Mixed Mode. When utility power returns, the Essential Loads may be returned to utility power in a closed transition manner by putting the Diesel EGs 910, 910', 910" in Mixed Mode. Generally, each Diesel EG must go to Iso-Droop Load Control to perform the no-break re-transfer to utility power. In Mixed Mode all Diesel EGs are generally controlled by Master Control Logic to synchronize with the newly restored utility, while keeping Diesel Engine power output the same as if the Diesel EGs were still in Droop Load Control. Under such control, the Diesel EGs 910, 910', 910" may share power through the IP Bus 955 as they synchronize with the utility and still maintain uniform Diesel power output. Essential loads 950, 950', 950" may be re-transferred from diesel power to utility power within the System Switchboard 920, 920', 920". As each re-transfer is made the Switchboard may disconnect from the IP Bus 955 by opening the IP Choke feeder at the Switchboard 920, 920', 920".

Diesel Failure Mode. If a Diesel Engine fails to start on command during a utility outage, the failed Diesel Engine-Generator 910, 910', 910" may be isolated at the System Switchboard 920, 920', 920", and the System Switchboard may go into Diesel Failure Mode. In this mode the Switchboard may import power from the IP Bus 955 via the IP Choke 995, 995', 995" for Essential Loads 950, 950', 950". The missing diesel power may be made up by all the remaining Diesel Engine-Generators 910, 910', 910" connected to the IP Bus 955.

Bypass Mode. While a System is in Diesel Failure Mode, its IP Choke 995, 995', 995" may be bypassed by closing the IP Choke Bypass Breaker 999, 999', 999" and opening its paired IP Choke Input Breaker 994, 994', 994" (BYP) to minimize voltage drop across the IP choke of the failed Diesel Engine-Generator. The Bypass Mode may also be entered manually by an operator. In Bypass Mode the Essential Load 950, 950', 950" may be placed on the IP Bus 955 and supported equally by all the remaining Diesel Engine-Generators 910, 910', 910" connected to the IP Bus 955. The Essential Load in bypass mode may no longer have the benefit of the Diesel Engine-Generator regulating its voltage and operates at the IP Bus voltage which may be less than the nominal value at an Output Bus. Generally, the amount of voltage depreciation depends on the ratio of bypassed Essential Load to the total of all Essential Loads 950, 950', 950" in the IP Configuration. Proper design of the IP Configuration may keep the IP Bus voltage within an acceptable range for the Essential Loads 950, 950', 950". Return from Bypass Mode may be accomplished by re-transferring the Bypass Breaker pair (BYP). Upon return of utility power the affected Essential Loads may be re-transferred to utility with an open transition, and the IP Choke 995, 995', 995" is disconnected. The total number of Systems 900, 900', 900" that may be in Bypass Mode should be limited.

Island Mode. Any System 900, 900', 900" may operate in Island Mode. In Island mode, both the IP Choke Input Breaker 994, 994', 994" and the Bypass Breaker 999, 999', 999" are typically opened. The System may be isolated from the IP bus 955 and no longer be part of the Isolated-Parallel Configuration. The Diesel Engine-Generator may backup its Essential Loads 950, 950', 950", but without the benefit of redundancy from the other Systems. Overloads on the System may result in the shedding of Essential Load 950, 950', 950", as appropriate.

The arrangement of the Essential-Only IP Bus 955 may be as shown in FIG. 9, or it may be arranged as a loop similar to that shown in FIG. 3. In the looped arrangement the IP Choke Bypass Breakers are typically connected to a dedicated section of the IP Bus.

Additional Features and Advantages. The present invention of the Iso-Parallel Configuration describes a new way to combine Diesel UPS Systems into redundant Configurations. An IP Configuration of Diesel UPS Systems may exhibit these very desirable characteristics:

1. The level of redundancy of the IP Configuration may be determined strictly by the amount of load, the total amount of System capacity, and the capacity of each System. There are not necessarily any designated redundant modules sitting idle.
2. When an outage occurs, the Diesel Engines may accept their respective loads quickly, because they are not required to synchronize with each other first. When all Systems are running on Diesel or Flywheel power the IP Chokes may tend to keep the UPS Output Busses in synchronization. No active generator synchronization controls are required, generally, for the Systems to operate in Flywheel or Diesel Modes.
3. Load inequalities tend to be balanced among the connected Diesel UPS Systems by allowing power to flow through the IP Chokes. In Diesel and Flywheel Modes the load inequalities may be completely balanced, allowing the most optimal sizing of Diesel Engines and Flywheels.
4. The utility fault isolation and response characteristics of the Diesel UPS Systems are, generally, not diminished when the Systems are in an IP Configuration.
5. Any Diesel UPS System with proper protection may experience an electrical fault without adversely affecting the Output Busses of the other remaining Systems in an IP Configuration. Fault isolation among Systems may be preserved, without having a single point of failure in the Configuration.
6. Essential and Critical Loads normally remain connected to their designated Systems. However, Critical Loads may be shifted from one Output Bus to another with little concern for the load capacity of each System. Fast-acting switches may be used for such switching, but they are not required to provide for redundancy within an IP Configuration.
7. The Motor-Generators on each UPS Output Bus may operate independently to adjust the Critical Load voltage regardless of the ratio of power drawn through the UPS Choke versus IP Choke. Therefore, the voltage of each Output Bus may be individually selected and controlled.

8. If one Diesel Engine fails to start, the Motor-Generator (MG) of that System may continue to run and support the Critical Load. The MG may correct for the voltage drop across the IP Choke, and the Flywheel may also be kept charged with power from the IP Bus. It is not necessary to transfer Critical Load to another System when a Diesel Engine fails.

9. Any System may experience a complete system failure or be taken out of service for maintenance without affecting any other Systems. While a System is in repair/maintenance, its Critical Load may be distributed evenly to all remaining Systems.

10. Any System and its Critical Load and Essential Load may be separated from the IP Configuration and run as a separate, although unsynchronized, stand-alone System.

11. The controls for individual Systems may operate separately for most modes of operation. During re-transfer to utility power, a Master Load Control Logic may be used to safely sequence Systems back to Normal Mode. However, a backup Pilot Wire System may be used in the absence of Master Load Control Logic. Therefore, there are, generally, no single points of failure in the IP Configuration controls.

12. Electrically-coupled Diesel UPS Systems may have the added benefit of being able to use any manufacturer's Engine-Generator set.

13. The IP Configuration may be adaptable to groups of Diesel Engine-Generators serving Essential Loads only.

Alternate Types of UPS Systems. The IP Configuration may also be adaptable to certain types of Static UPS Systems which operate with characteristics similar to Diesel UPS Systems. A static UPS module in which the output voltage is held in a definite phase relationship to the input voltage may be controlled to export power to and import power from a common IP bus via isolating IP chokes. The type of short-duration energy storage mechanism used by Static UPS Systems applied in IP Configurations need not be limited to chemical storage batteries, but may also include flywheels with appropriate AC to DC voltage converters. Conversely, chemical storage batteries with appropriate DC to AC converters can be substituted for flywheels in Diesel UPS Systems, and provide longer time periods for diesel engine starting.

The Isolated-Parallel Configuration of Diesel UPS Systems presents a flexible, economical solution that is free of single points of failure, where a diesel failure causes no reduction in UPS capacity, and expensive load switching mechanisms are not required. It may be configured in medium voltage as well as low voltage installations. An IP Configuration is applicable in a group consisting of a few modules, or a group with several dozen modules. An IP Configuration should prove very suitable for fault-tolerant power protection applications in future high-reliability facilities.

Although the present invention has been disclosed in detail, it should be understood that various changes, substitutions, and alterations can be made herein. Moreover, although electrical and mechanical hardware and firmware are described to control certain functions, such functions generally can be performed using either electrical or mechanical hardware, firmware, or a combination thereof, as is well known in the art. Other examples are readily ascertainable by one skilled in the art and can be made without departing from the spirit and scope of the present invention as defined by the following claims.

What is claimed is:

1. An isolated-parallel UPS configuration comprising:
two diesel UPS systems, operating at either low voltage, medium voltage or a combination or low and medium voltage, adapted to supply power from a utility power source to corresponding dedicated essential and critical loads, the diesel UPS systems adapted to operate as independent systems, each diesel UPS system including an inductive reactor (choke) adapted to condition utility power for use in critical loads, a diesel engine adapted to supply a long-duration alternate source of power for both critical and essential loads upon interruption of the utility power source, and an energy storage mechanism coupled to a motor-generator and adapted to supply a short-duration alternate source of uninterrupted power to its critical load upon the onset of power interruption for a period of time required for the diesel engine-generator to start and take over support of the critical loads;
a system switchboard for each diesel UPS system adapted to accommodate transferring essential and critical loads between utility power and diesel engine power;
an output bus for each diesel UPS system adapted to accommodate the attachment of the inductive reactor and motor-generator to critical loads and to facilitate the transfer of critical load to and from utility, diesel engine and short-duration power sources; and
at least one IP choke adapted to connect to the output bus of one of the Diesel UPS Systems adapted to allow power to flow from one output bus to the other output bus and to limit fault current between the diesel UPS systems, thereby isolating each diesel UPS system from faults on the other diesel UPS system.

2. The UPS configuration of claim 1, wherein in each diesel UPS system, the diesel engine is coupled to a generator and connected to the system switchboard, such that the diesel engine is electrically coupled to the energy storage mechanism and motor-generator couple.

3. The UPS configuration of claim 1, wherein in each diesel UPS system, the diesel engine and the energy storage mechanism and motor-generator couple are mechanically coupled with overriding clutches.

4. The UPS configuration of claim 3, further comprising two separate load busses, where each load bus is connected to a corresponding diesel UPS system output bus to supply power to critical loads, so as to provide for connection and isolation of the at least one IP choke, bypass of the critical load to the opposite diesel UPS system, and/or maintenance isolation of either diesel UPS system.

5. The UPS configuration of claim 1, further comprising a master control logic to operate the diesel UPS systems in an isolated-parallel configuration as a group adapted to make safe and reliable transfers from diesel power to utility power and to control the bypass operations of the diesel UPS systems.

6. The UPS configuration of claim 1, wherein the energy storage mechanism consists of chemical storage batteries.

7. The UPS configuration of claim 1, wherein the energy storage mechanism consists of mechanical flywheels.

8. An isolated-parallel UPS configuration comprising:
two diesel UPS systems, operating at either low voltage, medium voltage or a combination or low and medium voltage, adapted to supply power from a utility power source to corresponding dedicated essential and critical loads, the diesel UPS systems adapted to operate as independent systems, each diesel UPS system including an inductive reactor (choke) adapted to condition utility power for use in critical loads, a diesel engine adapted to supply a long-duration alternate source of power for both critical and essential loads upon interruption of the utility power source, and an energy storage mechanism coupled to a motor-generator and adapted to supply a short-duration alternate source of uninterrupted power to its critical load upon the onset of power interruption for a period of time required for the diesel engine-generator to start and take over support of the critical loads;

a system switchboard for each diesel UPS system adapted to accommodate transferring essential and critical loads between utility power and diesel engine power;

an output bus for each diesel UPS system adapted to accommodate the attachment of the inductive reactor and motor-generator to critical loads and to facilitate the transfer of critical load to and from utility, diesel engine and short-duration power sources;

a common synchronizing paralleling bus connected to the output busses and adapted to support exchanges of power between the diesel UPS systems; and at least one IP choke associated with each diesel UPS system and adapted to connect the output bus of the associated diesel UPS system to the synchronizing paralleling bus, to limit fault current into and out of the diesel UPS systems, thereby isolating faults to a single one of the diesel UPS systems.

9. The UPS configuration of claim 8, wherein in each diesel UPS system, the diesel engine is coupled to a generator and connected to the system switchboard, such that the diesel engine is electrically coupled to the energy storage mechanism and motor-generator couple.

10. The UPS configuration of claim 8, wherein in each diesel UPS system, the diesel engine and energy storage mechanism and motor-generator couple are mechanically coupled with overriding clutches.

11. The UPS configuration of claim 8, wherein the energy storage mechanism consists of chemical storage batteries.

12. The UPS configuration of claim 8, wherein the energy storage mechanism consists of mechanical flywheels.

13. The UPS configuration of claim 8, wherein the synchronizing parallel bus is arranged in a "star" radial configuration.

14. The UPS configuration of claim 8, wherein the synchronizing parallel bus is arranged in a looped configuration and is adapted to provide fault isolation to segments of the synchronizing parallel bus.

15. The UPS configuration of claim 8, wherein at least two separate load busses, each load bus being connected to a corresponding diesel UPS system output bus, supply power to critical loads, so as to provide for the connection and isolation of the at least one IP choke, bypass of the critical load to the synchronizing paralleling bus and thereby to all other diesel UPS systems, and/or maintenance isolation of any diesel UPS system.

16. The UPS configuration of claim 8, further comprising a master control logic to operate the diesel UPS systems in an isolated-parallel configuration as a group adapted to make safe and reliable transfers from diesel power to utility power.

17. The UPS configuration of claim 8, further comprising a pilot wire system including at least one of the following types of pilot wires:

a utility present pilot wire connected to a utility line,
an isochronous frequency pilot wire connected to a diesel UPS system,
an IP bus pilot wire connected to a common synchronizing paralleling bus, and
a bypass pilot wire connected to a load bus;

wherein the pilot wire system is adapted to execute one or more operational instructions in response to corresponding analog voltage and phase angle information sensed by the pilot wires.

18. The UPS configuration of claim 17, wherein the pilot wire system is adapted to execute the operational instructions independent of any master control logic.

19. An isolated-parallel engine-generator configuration comprising:

at least two diesel engine-generators, operating at either low voltage or medium voltage, adapted to supply power to at least two corresponding dedicated essential loads, each diesel engine-generator being connected to a system switchboard to supply an alternate source of power to each of the essential loads upon interruption of a utility power source;

a common synchronizing paralleling bus connected to the diesel engine-generators and adapted to support exchanges of power between the diesel engine-generators at their system switchboards; and at least one IP choke associated with each diesel engine-generator and connected between the system switchboard of the associated diesel engine-generator and the common synchronizing paralleling bus to limit fault current into and out of the system switchboards, thereby isolating faults to a single engine-generator or system switchboard.

20. The isolated-parallel engine-generator configuration of claim 19, wherein two or more diesel engine-generators are connected in parallel to each system switchboard to supply power to the essential load.

21. An isolated-parallel UPS configuration comprising:

at least two static UPS systems adapted to supply power from a utility power source to corresponding dedicated critical loads, the UPS systems adapted to operate as independent systems, and each UPS system including means for conditioning utility power for use in critical loads, and an energy storage mechanism adapted to supply a short-duration alternate source of uninterrupted power to its critical load upon the onset of power interruption for the duration of time required for a long-duration alternate power source to become engaged;

a system switchboard for each static UPS System adapted to accommodate transferring UPS system and/or its critical loads between utility power and the long-duration alternate power source;

an output bus for each static UPS system adapted to accommodate the attachment of the UPS system to critical loads and to facilitate the bypass of critical load around the UPS system;

a common synchronizing paralleling bus connected to the output busses and adapted to support exchanges of power between the static UPS systems; and at least one IP choke associated with each static UPS system and adapted to connect the output bus of the associated UPS system to the synchronizing paralleling bus, to limit fault current into and out of the UPS systems, thereby isolating faults to a single one of the static UPS systems.

22. The UPS configuration of claim 21, wherein the energy storage mechanism consists of chemical storage batteries.

23. The UPS configuration of claim 21, wherein the energy storage mechanism consists of mechanical flywheels.

* * * * *